United States Patent
Hung (10) Patent No.: US 10,703,525 B2
(45) Date of Patent: Jul. 7, 2020

(54) LABEL FILM FEATURING HIDDEN PATTERN REVEALABLE THROUGH SCRAPING SURFACE AND MANUFACTURING METHOD THEREOF

(71) Applicant: Tzu-Chin Hung, Taipei (TW)

(72) Inventor: Tzu-Chin Hung, Taipei (TW)

( * ) Notice: Subject to any disclaimer, the term of this patent is extended or adjusted under 35 U.S.C. 154(b) by 251 days.

(21) Appl. No.: 15/813,795

(22) Filed: Nov. 15, 2017

(65) Prior Publication Data
US 2019/0127105 A1  May 2, 2019

(30) Foreign Application Priority Data
Oct. 30, 2017 (TW) .............................. 106137463 A (51) Int. Cl.
| | |
|---|---|
| B65C 9/26 | (2006.01) |
| B65C 9/46 | (2006.01) |
| B41F 23/00 | (2006.01) |
| B41F 9/00 | (2006.01) |
| B41M 3/00 | (2006.01) |
| G09F 3/02 | (2006.01) |
| B41M 1/10 | (2006.01) |
| C09D 11/00 | (2014.01) |

(52) U.S. Cl.
CPC .................. *B65C 9/26* (2013.01); *B41F 9/00* (2013.01); *B41F 23/00* (2013.01); *B41M 3/005* (2013.01); *B65C 9/46* (2013.01); *G09F 3/02* (2013.01); *B41M 1/10* (2013.01); *C09D 11/00* (2013.01); *G09F 2003/021* (2013.01); *G09F 2003/0213* (2013.01)

(58) Field of Classification Search
CPC ... B65C 9/26; B65C 9/46; B41F 23/00; B41F 9/00; B41M 1/10; B41M 3/005; G09F 3/02; G09F 2003/021; G09F 2003/0213; C09D 11/00; C09D 11/08; C09D 11/14

USPC ................. 106/31.69, 31.64; 273/138.1, 292
See application file for complete search history.

(56) References Cited

U.S. PATENT DOCUMENTS

| | | | |
|---|---|---|---|
| 6,199,757 B1* | 3/2001 | Kubert | G06K 13/07 235/375 |
| 6,544,323 B2* | 4/2003 | An | C09D 11/18 106/31.6 |
| 2009/0062473 A1* | 3/2009 | Matsuda | C09D 11/03 525/153 |

FOREIGN PATENT DOCUMENTS

| | | |
|---|---|---|
| TW | M461608 U | 9/2013 |
| TW | M501949 U | 6/2015 |

* cited by examiner

*Primary Examiner* — Laura C Powers
(74) *Attorney, Agent, or Firm* — Rosenberg, Klein & Lee (57) ABSTRACT

Disclosed are a label film including a hidden pattern that is displayable through scraping a surface thereof and a manufacturing method thereof. A concealment scraping layer printing ink is formed by mixing, in respect of volume ratio, 1-10% nitrocellulose, 5-15% polyamide resin, 20-30% silver paste, 5-15% pearl powder, 10-20% ethyl acetate, 20-30% toluene, and 5-15% isopropyl alcohol and applied with intaglio printing such that a displayable mark formed of a traditional printing ink and including at least one pattern, character, or mark and at least one concealment scraping layer pattern formed with the concealment scraping layer printing ink are combined together and collectively formed on and attached to at least one surface of a single-layer label film substrate, with the concealment scraping layer pattern set on and covering at least one displayable mark, followed by steps of slitting, bonding, and cutting, to form a label film having at least one concealment scraping layer pattern covering and concealing at least one displayable mark through a combined printing operation.

6 Claims, 11 Drawing Sheets

LABEL FILM FEATURING HIDDEN PATTERN REVEALABLE THROUGH SCRAPING SURFACE AND MANUFACTURING METHOD THEREOF

BACKGROUND OF THE INVENTION

1. Field of the Invention

The present invention relates to a label film that is applicable as thermal shrinkage packaging label film, which comprises a concealment scraping layer pattern formed of concealment scraping layer ink that is printed in a combined manner to cover and conceal at least one displayable mark, and a manufacturing method thereof.

2. The Related Arts

Thermal shrinkage label films have been widely used in applications of thermal shrinkage packages, particularly outer packages for consumer products, such as foods, beverages, optical disks, and books, and industrial products. With the consumers and makers placing increasing weight on the value and popularization of fake protection of products, point-collection reward or redemption, there is an increasing demand for heightening levels of printing quality and external visual perception of product package films in respect of fake protection and point-collection reward or redemption. However, the known structures of fake protection and point-collection reward or redemption provided on a surface of a label film are often such that a sticker or a label that is prepared separately through printing for the purpose of fake protection and point-collection reward or redemption is externally and additionally attached to a label film after printing of the label film has been completed. An example is Taiwan Utility Model M501949, which discloses a removable information-hidden card, in which a structure, as well as technique associated therewith, of a composite material card that carries hidden information of product fake protection and point-collection reward and redemption is provided for adhesively attaching to a package film. Fabrication of such a known structure is generally time- and labor-consuming and requires a high cost. In addition, additional labor and time cost is necessary for attaching to the package film. Further, the card is attached to a package film manually and this leads to inconsistency of product quality, severely affecting quality of product appearance.

Further, a portion of a printed package film, such as one discussed above, is often coated with a silver paste material for covering the site where the information concerning product fake protection and point-collection reward and redemption that are to be hidden are located so that such information of fake protection and point-collection reward and redemption can be covered and concealed by the silver paste material and would only be removed by a consumer through scraping to reveal or uncover the contents of the information. Such a known structure and technique of coating the silver paste material on a surface of a package film through a second-time operation would require working hours, labor, and cost for coating the silver paste material on the surface of the package film through a second-time operation and in addition, the second-time operation of coating the silver paste material on the package film suffers the silver paste being not securely attached to the surface of the package film if the coating is not thick enough. Thus, for the known package film, in order to have the coating of the silver paste material layer provided in the second-time operation of coating securely attached to the surface of the package film, the thickness of the coating must be increased to at least around 0.5 mm. This severely affects the overall visual perception of the package film, making it irregular and inconsistent. In addition, the silver paste coating layer is not formed as being integrally formed with the package film so that the attaching force is generally weak. Consequently, localized cracking or peeling, which leads to loss of functionality of fake protection and point-collection reward and redemption, may occur once the package film undergoes a high-temperature thermal shrinkage process conducted in a thermal shrinkage oven. These are all issues to be handled for the known package films.

In addition, prior art patent documents are known. An example is Taiwan Utility Model M461608, which discloses an identification body provided on a jar, in which an identification body (1) in the form of a package film is coated, on a specific area, with and covered by a plurality of silver paste layer (15). By scraping off the silver paste layer (15), texts or patterns printed on the identification body (1) or an identification mark (14) combined therewith can be displayed and visible so as to achieve the purpose of identification. However, the teaching of the utility model similarly adopts a structure of coating a silver paste material to cover a printed package film and similarly suffers the problems of irregular and inconsistent surface of the silver paste layer (15) that affects external appearance. Also, the silver paste layer (15) is formed on the label film through a second-time operation and this consumes time and labor and thus increases cost. In addition, the silver paste layer (15) is susceptible to peeling or cracking once the package film is subjected to a high-temperature thermal shrinkage process conducted in a thermal shrinkage oven so as to lose the function of hiding the fake protection and point-collection reward and redemption of the package film.

SUMMARY OF THE INVENTION

The primary objective of the present invention is to provide a label film featuring uncovering hidden pattern through scraping surface and a manufacturing method thereof, which overcome the time-consuming and labor consuming issues, high cost, and irregularity and inconsistency that affect overall appearance of a package film, caused by the structures and techniques applied to hide the information of fake protection and point-collection reward and redemption used in the above patent or conventional package film resulting from attaching a card to the surface package film and the second-time operation of coating silver paste layers on the package film, and also help overcome the issue of loss of functionality of fake protection and point-collection reward and redemption due to cracking or peeling of the silver paste of the second-time coating operation occurring in a high-temperature thermal shrinkage process.

Thus, the present invention provides a label film including a hidden pattern that is displayable through scraping a surface thereof, wherein the label film comprises:

a single-layer label film substrate, which has at least one surface that is formed, through intaglio printing or traditional ink printing, with at least one displayable mark; and at least one concealment scraping layer pattern, which comprises, in volume ratio, 1-10% nitrocellulose, 5-15% polyamide resin, 20-30% silver paste, 5-15% pearl powder, 10-20% ethyl acetate, 20-30% toluene, and 5-15% isopropyl alcohol, which are mixed to form a concealment scraping layer printing ink, that is applied with intaglio printing such that the at least one displayable mark formed on the at least one surface of the single-layer label film substrate and the at least one concealment scraping layer pattern formed with the scraping layer printing ink are combined together and collectively formed on and attached to the at least one surface of the single-layer label film substrate, wherein the concealment scraping layer pattern is set on and covers the at least one displayable mark.

Further, in the label film including a hidden pattern that is displayable through scraping a surface thereof according to the present invention as described above, the at least one displayable mark formed on the at least one surface of the single-layer label film substrate comprises at least one pattern, character, or mark.

In the label film including a hidden pattern that is displayable through scraping a surface thereof according to the present invention as described above, the concealment scraping layer pattern has a thickness of 0.1 mm-0.3 mm.

In the label film including a hidden pattern that is displayable through scraping a surface thereof according to the present invention as described above, the single-layer label film substrate comprises a single layer of film formed of a material comprising PVC (Polyvinylchloride), OPS (Oriented Polystyrene), PET-G (Polyethylene Terephthalate Glycol-modified), PLA (Polylactic Acid), BOPP (Biaxially Oriented Polypropylene), POF (Polyolefin), CPP (Non-Oriented Casting Polypropylene) or OPP (Oriented Polypropylene).

The present invention also provides a method for manufacturing a label film having a hidden pattern revealable through surface scraping, comprising the following steps:

(a) preparation of concealment scraping layer printing ink, wherein, in respect of volume ratio, 1-10% nitrocellulose, 5-15% polyamide resin, 20-30% silver paste, 5-15% pearl powder, 10-20% ethyl acetate, 20-30% toluene, and 5-15% isopropyl alcohol are provided and mixed to form concealment scraping layer printing ink;

(b) intaglio printing, wherein the concealment scraping layer printing ink prepared in step (a) is introduced, in combination with traditional printing ink, into an intaglio printing machine to carry out intaglio printing such that at least one displayable mark that is formed of the traditional printing ink and at least one concealment scraping layer pattern that is formed of the concealment scraping layer printing ink are integrally and collectively printed on and attached to at least one surface of a single-layer label film substrate, wherein the concealment scraping layer pattern is set on and covers the at least one displayable mark;

(c) slitting treatment, wherein the single-layer label film substrate that is prepared in step (b) and includes the at least one displayable mark and the at least one concealment scraping layer pattern formed with intaglio printing is processed and slit with a slitter machine to form a plurality of strips of label film;

(d) bonding treatment, wherein each of the label film strips prepared in step (c) is processed to have two opposite side edges bonded to each other; and (e) cutting treatment, wherein each of the plurality of label film strips that have been subject to the bonding treatment in step (d) is subjected to cutting to provide a label film that includes the at least one displayable mark covered and concealed by the at least one concealment scraping layer pattern.

In the method for manufacturing a label film having a hidden pattern revealable through surface scraping according to the present invention as described above, the at least one displayable mark formed on the at least one surface of the single-layer label film substrate in step (b) comprises at least one pattern, character, or mark.

The efficacy of the label film including a hidden pattern that is displayable through scraping a surface thereof and the manufacturing there of according to the present invention are that at least one concealment scraping layer pattern that is formed of a concealment scraping layer printing ink formed by mixing, in respect of volume ratio, 1-10% nitrocellulose, 5-15% polyamide resin, 20-30% silver paste, 5-15% pearl powder, 10-20% ethyl acetate, 20-30% toluene, and 5-15% isopropyl alcohol with a solvent and at least one displayable mark formed a traditional printing ink are integrally formed on and attached to at least one surface of a single-layer label film substrate through intaglio printing such that the concealment scraping layer pattern is set on and covers the displayable mark and has a thickness that is just 0.1-0.3 mm, whereby there is no risk that an excessive thickness of the concealment scraping layer pattern negatively affects the outside appearance of the label film and the concealment scraping layer pattern and the displayable mark are printed, in a manner of being combined together as an integrated structure, on the single-layer label film substrate so that there is no need for a second-time operation and thus, time, labor, and cost can be greatly saved and, in addition, the concealment scraping layer pattern is maintained securely attached to the single-layer label film substrate (which can be a package film) even undergo a high-temperature thermal shrinkage process carried out in a thermal shrinkage oven so that there is no concern about peeling and cracking. Thus, the problems that the techniques heretofore or disclosed in the prior art patent documents suffer, resulting from a silver paste layer formed through a second-time operation of coating that might get cracking or peeling upon subjecting to high-temperature thermal shrinkage so as to loss the functionality of fake protection and point-collection reward and redemption, can be all overcome or alleviated. Thus, the industrial utilization and economic value of the present invention are made high.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
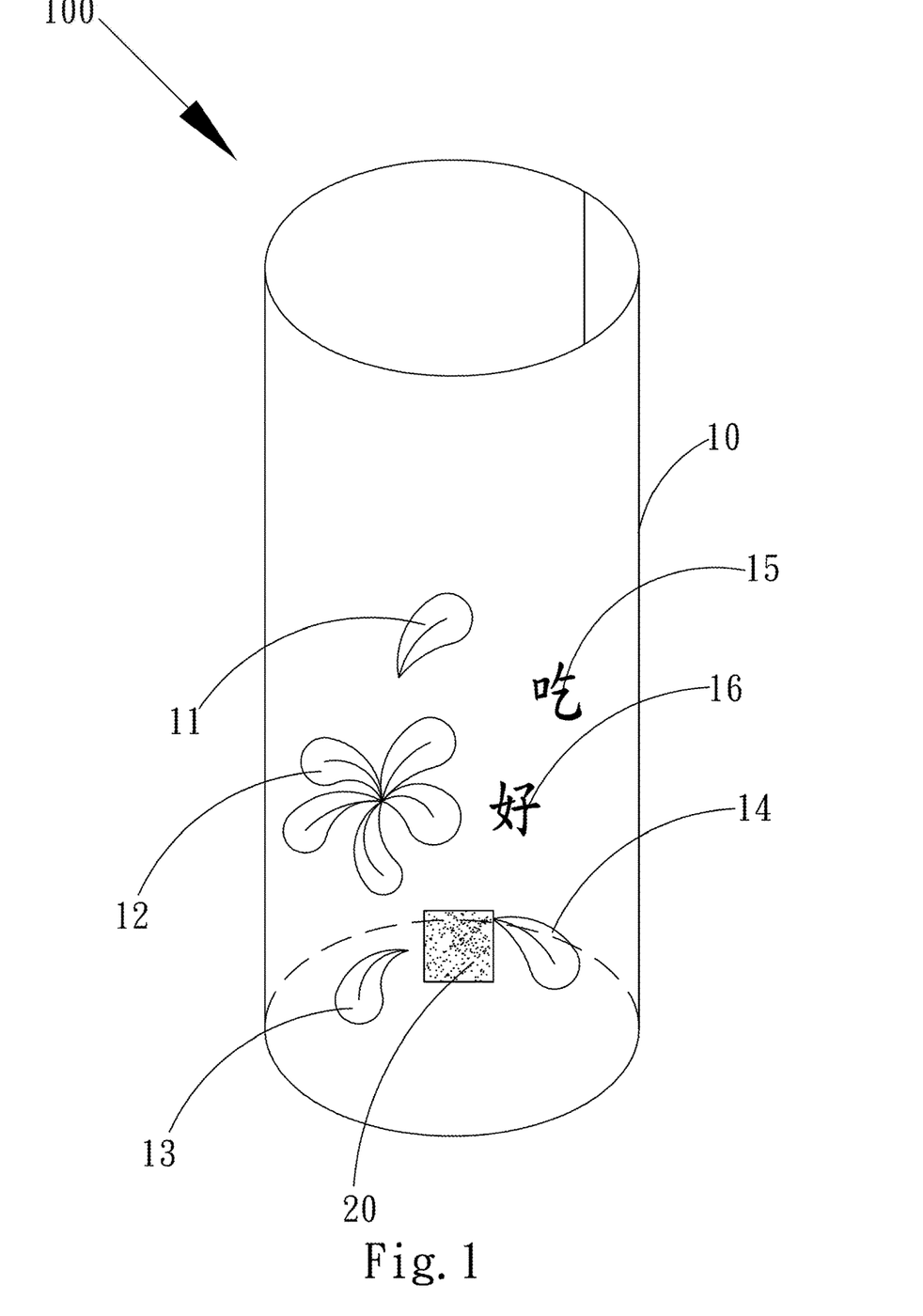
FIG. 1 is a perspective view showing a label film including a hidden pattern that is displayable through scraping a surface thereof according to the present invention.
Figure 2:
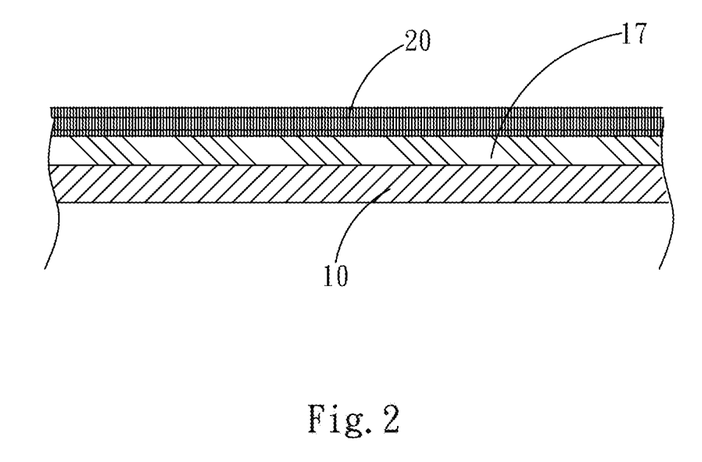
FIG. 2 is a cross-sectional view, in an enlarged form, of a portion of FIG. 1, showing the structures of a single-layer label film substrate, a displayable mark, and a concealment scraping layer pattern according to the present invention.

Referring to FIGS. 1 and 2, the present invention provides a label film that includes a hidden pattern revealable through surface scraping, generally designated at 100, comprising a single-layer label film substrate 10. The single-layer label film substrate 10 can be a single layer of film formed of PVC, OPS, PET-G, PLA, BOPP, POF, CPP, or OPP. The single-layer label film substrate 10 has at least one surface that is formed with at least one displayable mark 11, 12, 13, 14, 15, 16, 17 by means of intaglio printing or traditional ink printing. The displayable marks 11, 12, 13, 14, 15, 16, 17 can each be made up of at least one of patterns, characters, and marks, or a combination thereof. In a first embodiment of the present invention, as an example of illustration, he displayable marks 11, 12, 13, 14, 15 each comprise a pattern, while the displayable marks 15, 16, 17 each comprise a Chinese character.

Figure 4:
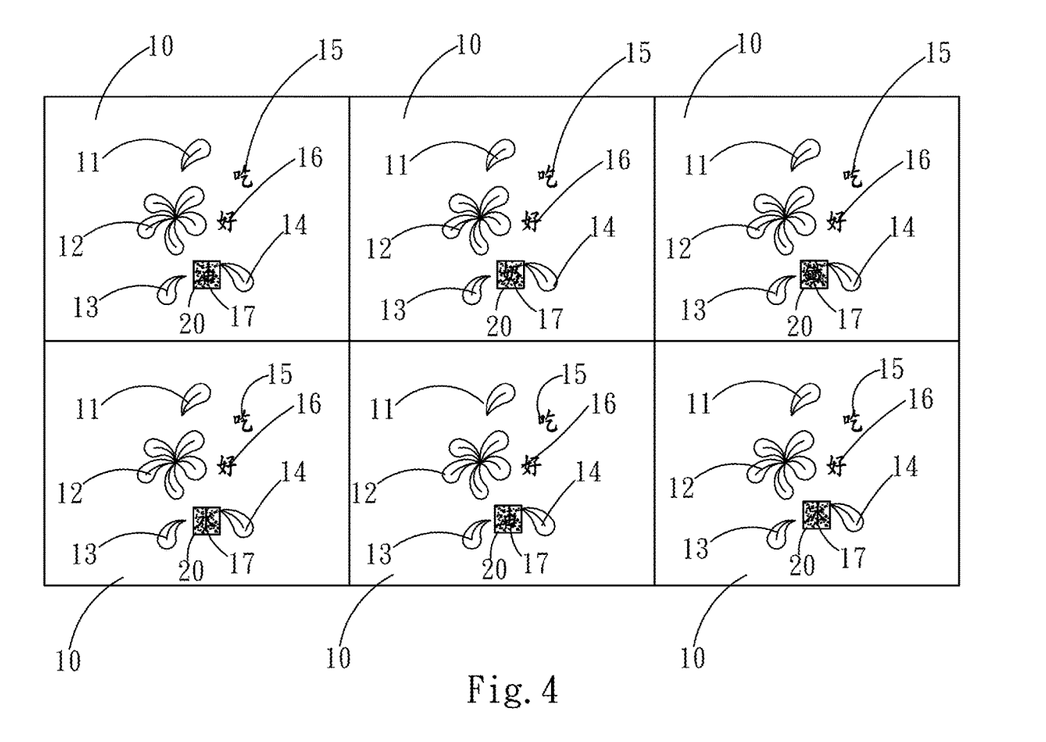
FIG. 4 is a schematic view illustrating the label film including a hidden pattern that is displayable through scraping a surface thereof according to the present invention in a condition just after intaglio printing.

At least one concealment scraping layer pattern 20 is provided, comprising, in respect of volume ratio, 1-10% nitrocellulose, 5-15% polyamide resin, 20-30% silver paste, 5-15% pearl powder, 10-20% ethyl acetate, 20-30% toluene, and 5-15% isopropyl alcohol, which are mixed to provide a concealment scraping layer printing ink that is applied with intaglio printing such that the at least one displayable mark 11, 12, 13, 14, 15, 16, 17 provided on one surface of the single-layer label film substrate 10 (as shown in FIGS. 2 and 4) and the at least one concealment scraping layer pattern 20 formed with the scraping layer printing ink are combined together and collectively formed on and attached to the surface of the single-layer label film substrate 10, wherein the concealment scraping layer pattern 20 is set on and covers at least one displayable mark 17 (as shown in FIG. 2). The concealment scraping layer pattern 20 may have a shape or outline that is not limited to any specific one, and in an embodiment of the present invention, a rectangular shape is taken as an example for illustration. Further, the concealment scraping layer pattern 20 has a thickness of 0.1-0.3 mm.

Figure 3:
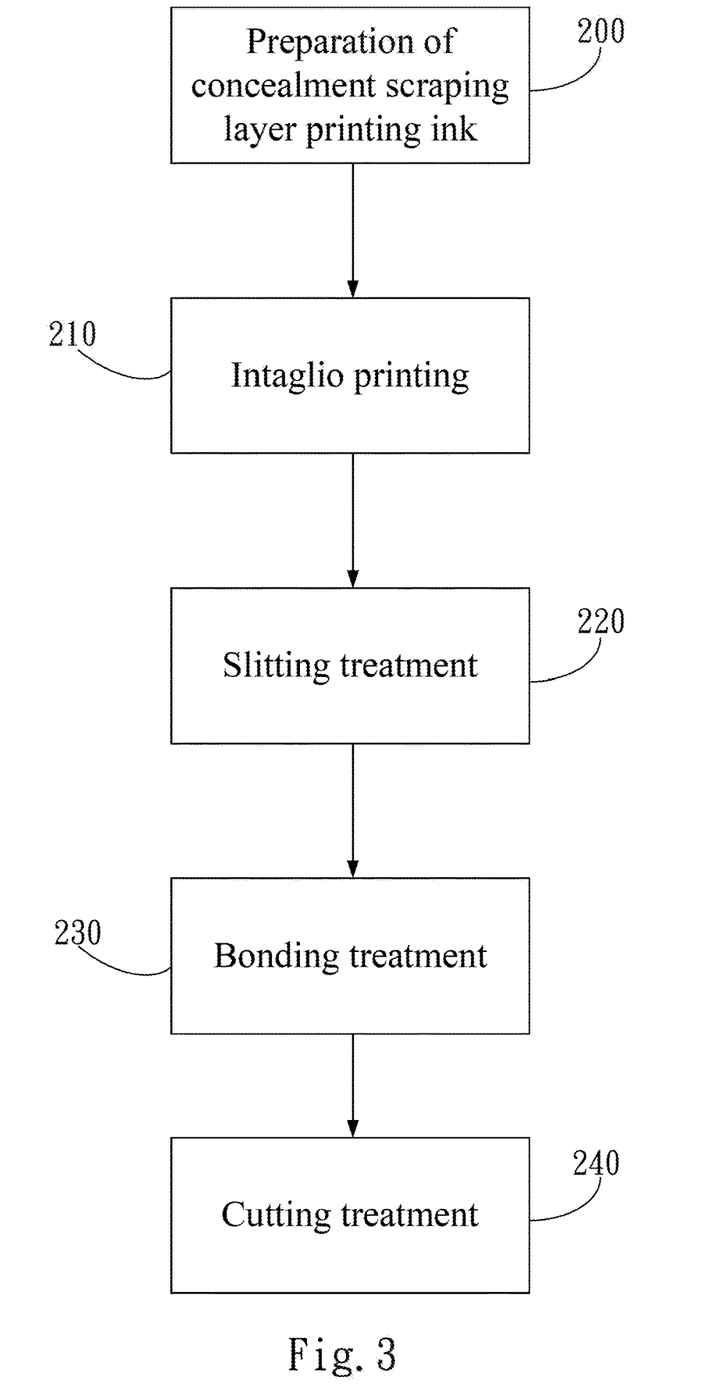
FIG. 3 is a flow chart illustrating a method for manufacturing a label film including a hidden pattern that is displayable through scraping a surface thereof according to the present invention.
Figure 5:
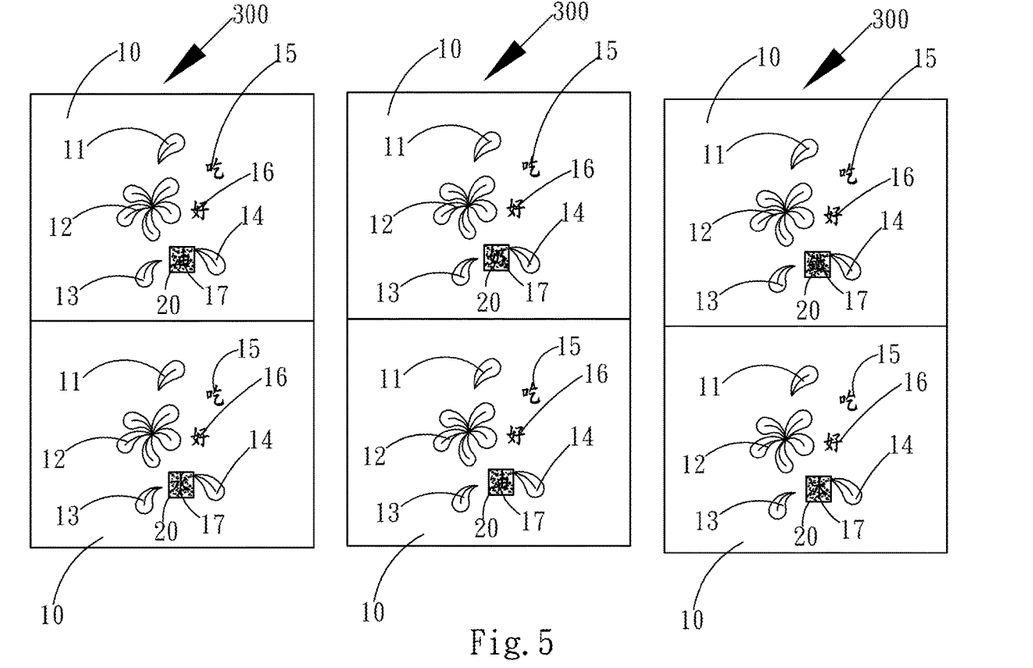
FIG. 5 is a schematic view illustrating a slitting process of the label film including a hidden pattern that is displayable through scraping a surface thereof according to the present invention.
Figure 6:
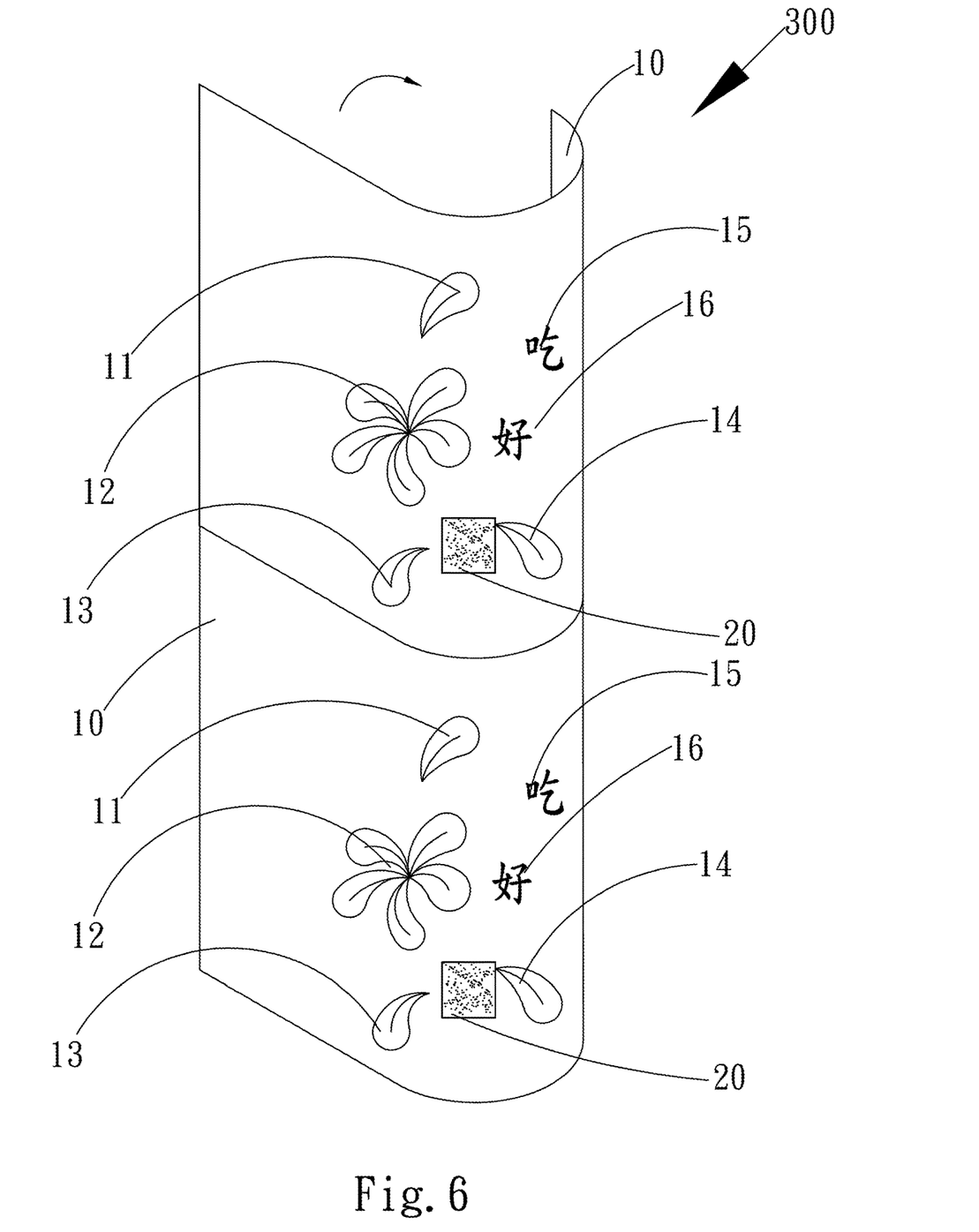
FIG. 6 is a schematic view illustrating a bonding process of the label film including a hidden pattern that is displayable through scraping a surface thereof according to the present invention.

Referring to FIGS. 3, 4, 5, and 6, FIG. 3 is a flow chart illustrating a manufacturing method of a stereoscopic pattern label film according to the present invention, which comprises the following steps, including steps 200-240:

(200) Preparation of concealment scraping layer printing ink, wherein, in respect of volume ratio, 1-10% nitrocellulose, 5-15% polyamide resin, 20-30% silver paste, 5-15% pearl powder, 10-20% ethyl acetate, 20-30% toluene, and 5-15% isopropyl alcohol are provided and mixed to form concealment scraping layer printing ink;

(210) Intaglio printing, wherein the concealment scraping layer printing ink prepared in step (200) is introduced, in combination with traditional printing ink, into an intaglio printing machine to carry out intaglio printing such that at least one displayable mark 11, 12, 13, 14, 15, 16, 17 that is formed of the traditional printing ink and the at least one concealment scraping layer pattern 20 that is formed of the concealment scraping layer printing ink are integrally and collectively printed on and attached to at least one surface of the single-layer label film substrate 10, wherein the concealment scraping layer pattern 20 set on and covering the at least one displayable mark 17 (as shown in FIGS. 2 and 4);

(220) Slitting treatment, wherein the single-layer label film substrate 10 that is prepared in step (210) and includes the displayable mark 11, 12, 13, 14, 15, 16, 17 and the concealment scraping layer pattern 20 formed with intaglio printing is processed and slit with a slitter machine to form a plurality of strips of label film 300 (as shown in FIG. 5);

(230) Bonding treatment, wherein each of the label film strips 300 prepared in step (220) is processed to have two opposite side edges bonded to each other (as indicated by an arrow shown in FIG. 6); and (240) Cutting treatment, wherein each of the plurality of label film strips 300 that have been subject to the bonding treatment in step (230) is subjected to cutting to provide a label film 100 that includes at least one displayable mark 17 covered and concealed by at least one concealment scraping layer pattern 20, as shown in FIG. 1.

Figure 7:
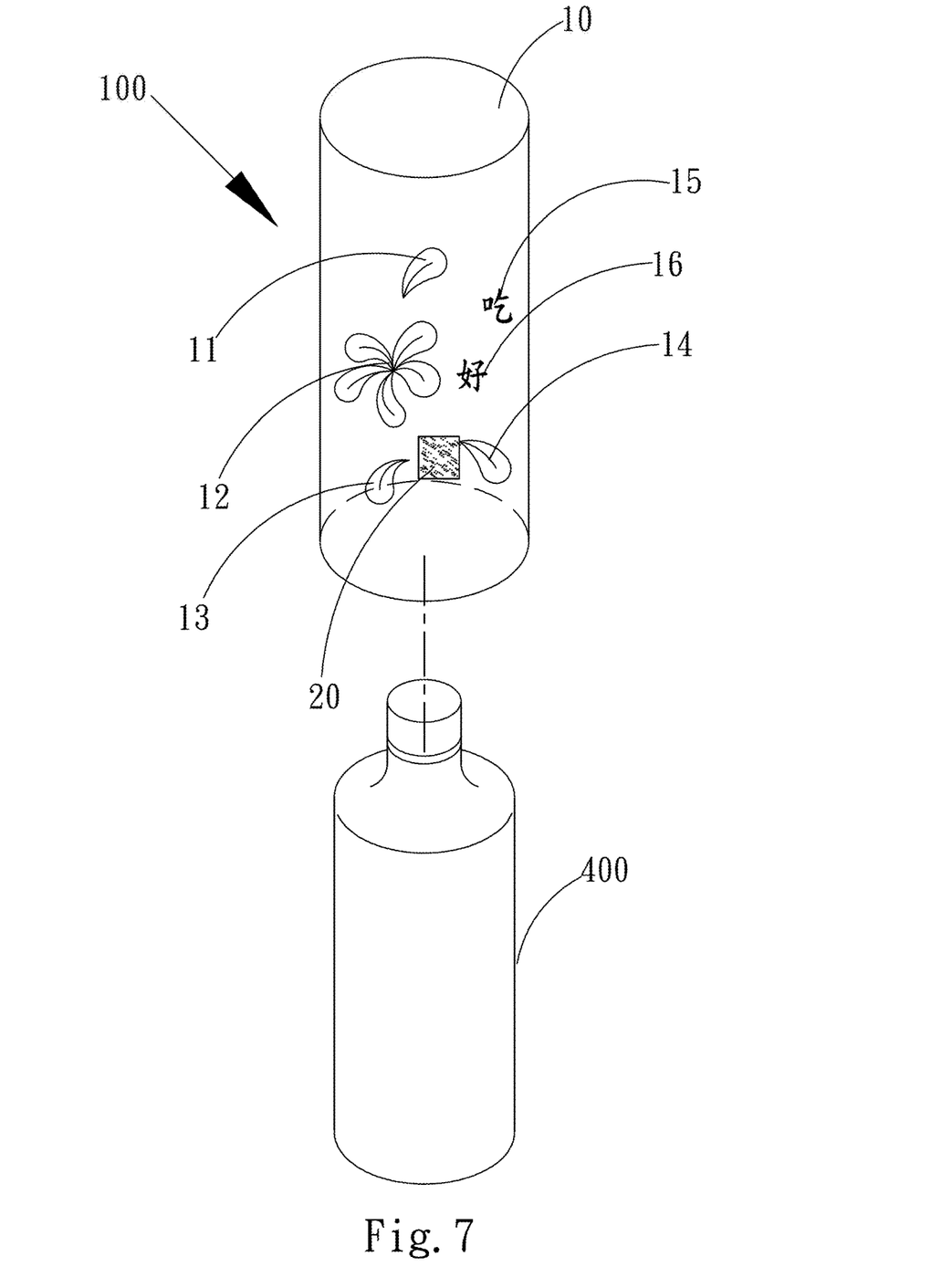
FIG. 7 is a schematic view illustrating a first example of application of the label film including a hidden pattern that is displayable through scraping a surface thereof according to the present invention.
Figure 8:
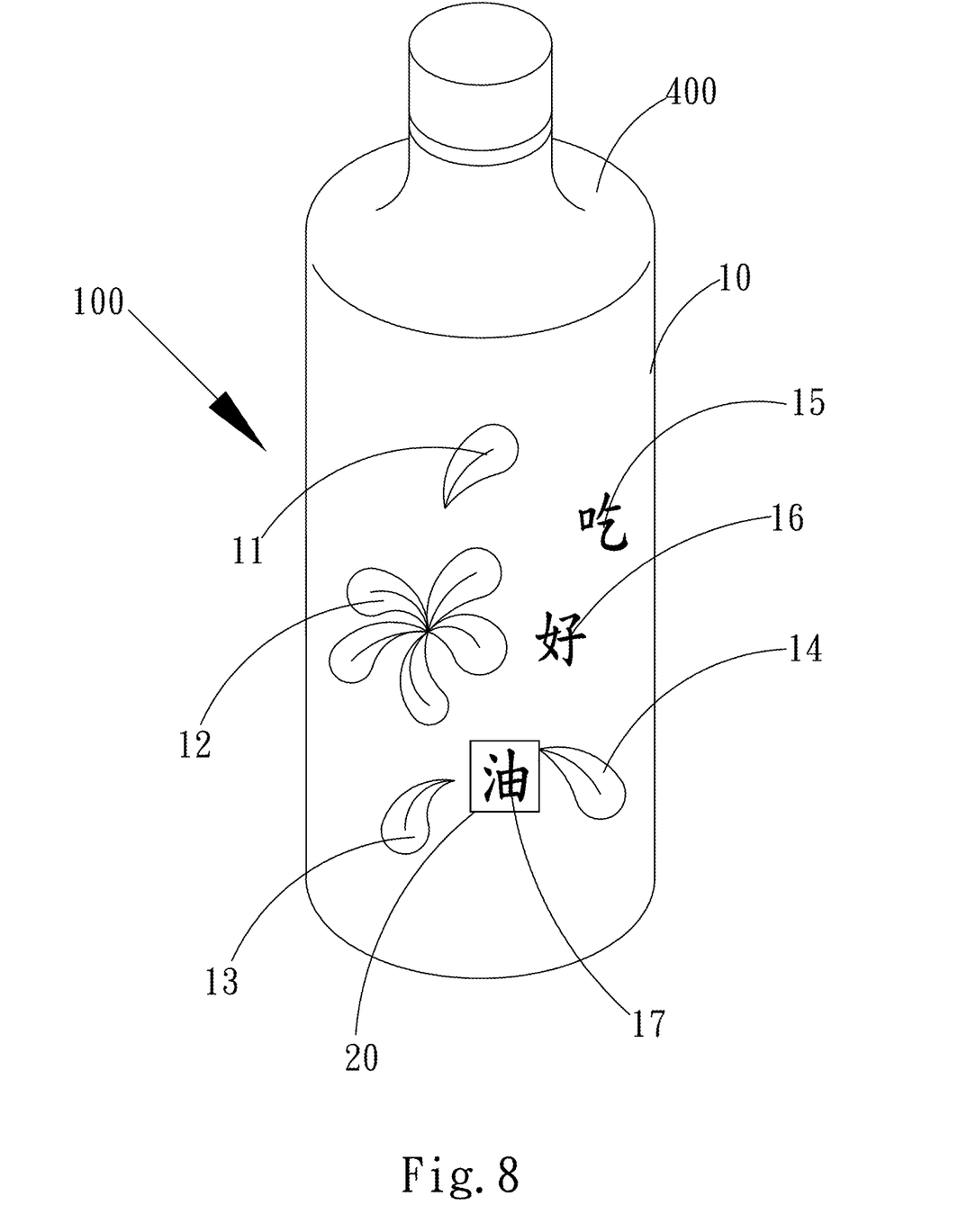
FIG. 8 is a schematic view illustrating a condition where the label film including a hidden pattern that is displayable through scraping a surface thereof shown in FIG. 7 is sleeved over an external of a jar-like object.

Referring to FIGS. 7 and 8, a first example of application of the label film 100 including a hidden pattern revealable through surface scraping according to the present invention is illustrated, wherein the label film 100, as being bonded at opposite edges to form a hollow cylindrical configuration, is sleeved over a jar-like object 400 and is subjected to heating with a hot-flow thermal shrinkage machine or hot vapor thermal shrinkage machine having an operation temperature range that can be a high temperature of 90-150° C. or a middle to high temperature of 50-150° C. so that the label film 100 undergoes thermal shrinkage to that package on a surface of the jar-like object 400, wherein the concealment scraping layer pattern 20 and the displayable mark 11, 12, 13, 14, 15, 16, 17 formed on the surface of the single-layer label film substrate 10 are integrated one-time printing so that surface irregularity and flatness of the concealment scraping layer pattern 20 can be guaranteed and is completely free of cracking or peeling even undergoing a thermal shrinkage process of middle or high temperature. The concealment scraping layer pattern 20 can be removed through scraping (as shown in FIG. 8) to reveal and display the displayable mark 17, which may be a reward projection involving character matching or character collection, and may additionally provide a function of fake protection of a product of the jar-like object 400.

Figure 9:
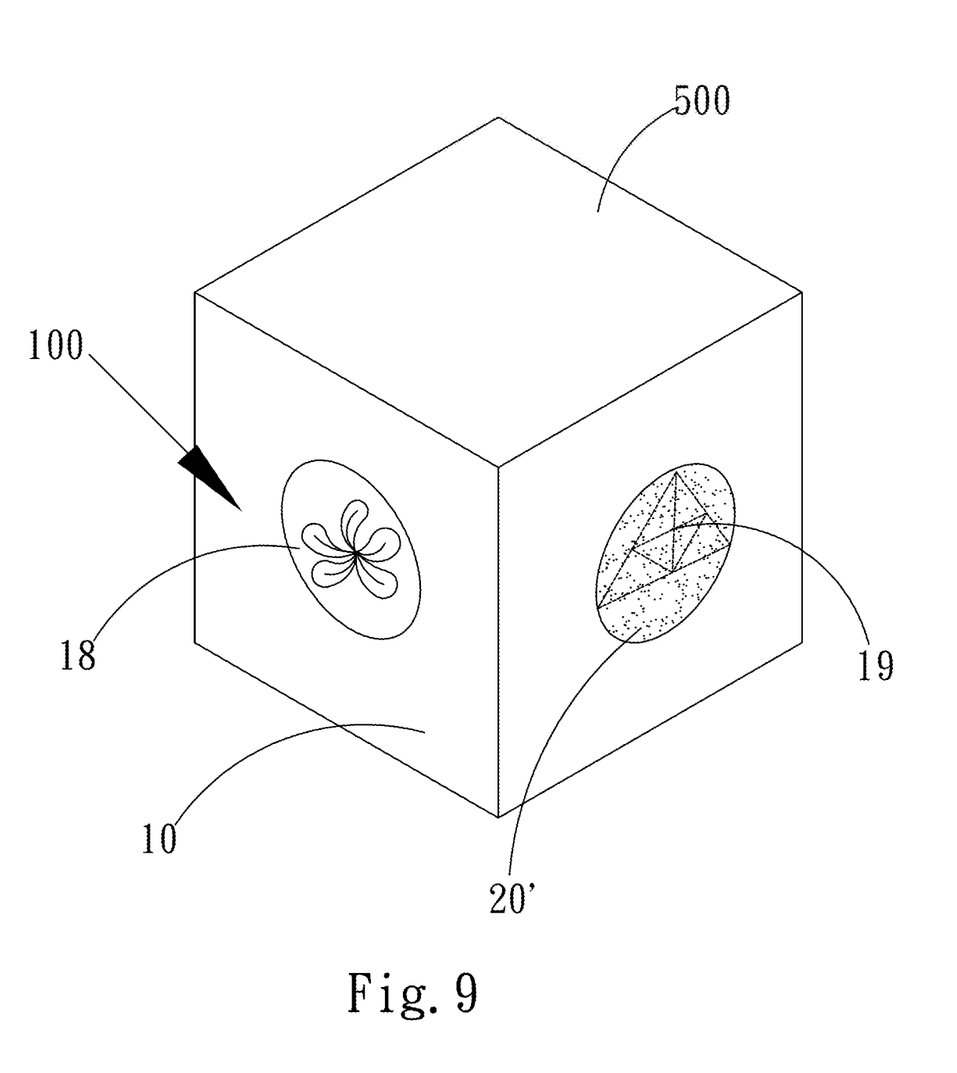
FIG. 9 is a schematic view illustrating a second example of application of the label film including a hidden pattern that is displayable through scraping a surface thereof according to the present invention.

Referring to FIG. 9, a second example of application of the label film 100 including a hidden pattern revealable through surface scraping according to the present invention is illustrated, wherein the label film 100 is subjected to thermal shrinkage to package on the external of a box-like product 500. The displayable marks 18, 19 are respectively formed of a pattern and a mark. The concealment scraping layer pattern 20' is of a circular shape and is set on and covers the displayable mark 19. Removal of the concealment scraping layer pattern 20' through scraping may reveal and display the displayable mark 19, which may serve as a measure for redemption through mark matching or fake protection of the box-like product 500.

Figure 10:
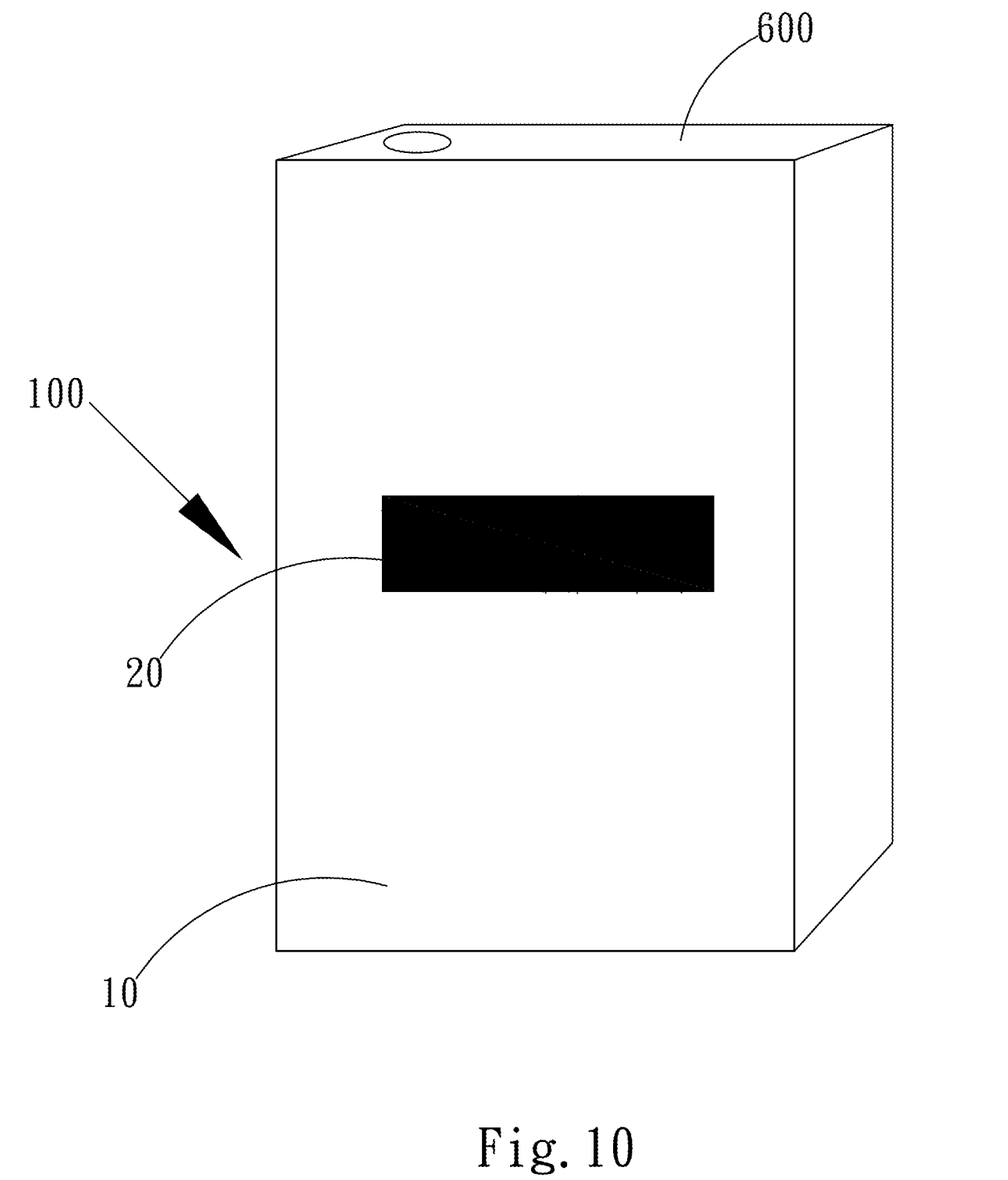
FIG. 10 is a schematic view illustrating a third example of application of the label film including a hidden pattern that is displayable through scraping a surface thereof according to the present invention.
Figure 11:
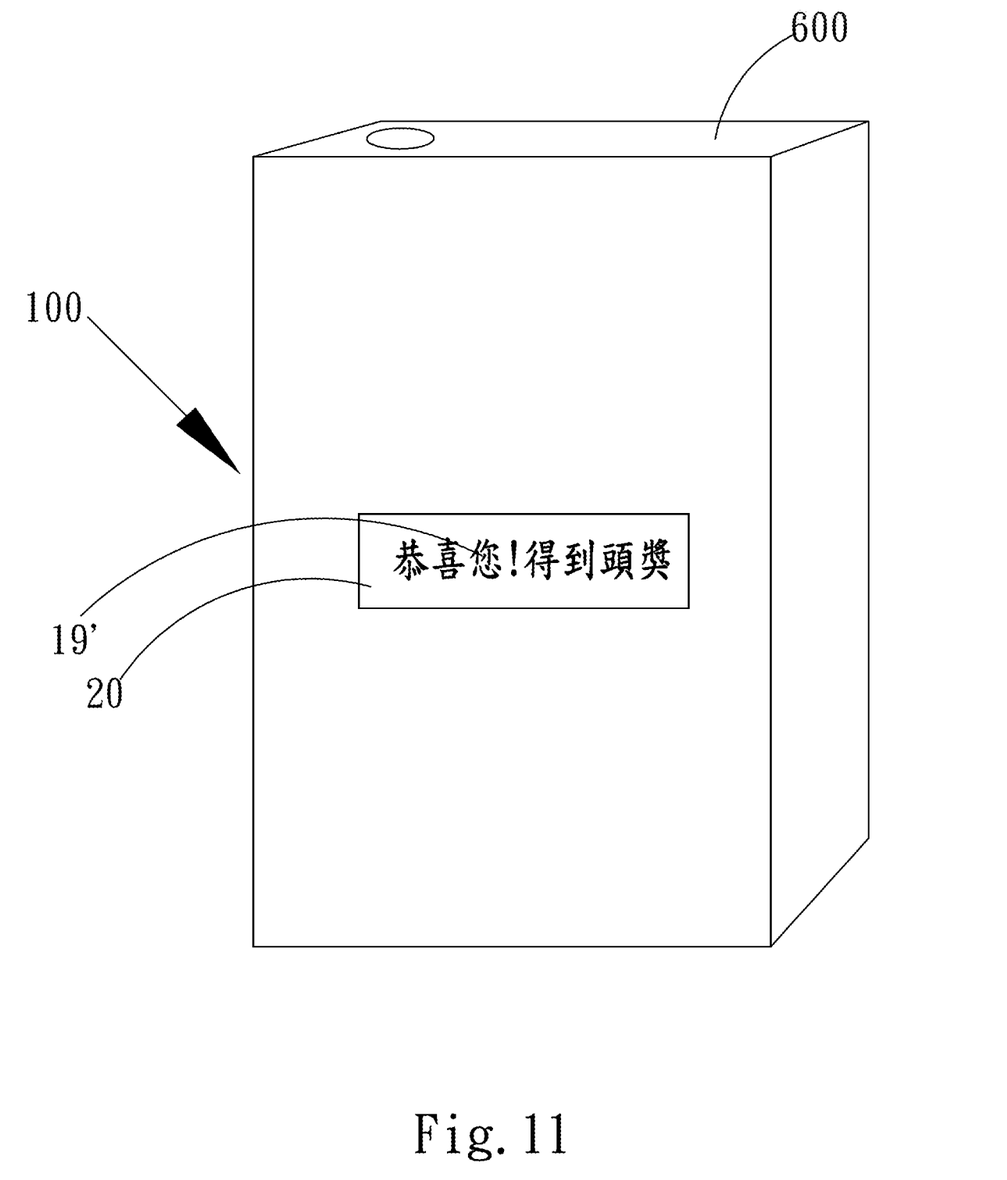
FIG. 11 is a schematic view illustrating the label film including a hidden pattern that is displayable through scraping a surface thereof, as shown in FIG. 10, in a condition after a concealment scraping layer pattern is scraped off to reveal a displayable mark.

Referring to FIGS. 10 and 11, a third example of application of the label film 100 including a hidden pattern revealable through surface scraping according to the present invention is illustrated, wherein the label film 100 is subjected to thermal shrinkage to package on the external of a beverage pack 600. The display mark 19' provided on the surface of the single-layer label film substrate 10 is made up of a phrase representing a reward to be provided and is covered and concealed by the concealment scraping layer pattern 20. A consumer may scrape and remove the concealment scraping layer pattern 20 (as shown in FIG. 11) to reveal the contents of the reward represented by the displayable mark 19'. In this way, there is no need to additionally and externally attach a reward card to the external of the beverage pack 600 so that outside appearance aesthetics can be guaranteed. In addition, the concealment scraping layer pattern 20 is not affected by the high temperature of middle to high temperature applied in a thermal shrinkage process and does not cause any cracking and peeling problem. This improves the range of application and industrial value of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A label film, comprising:
   a single-layer label film substrate having at least one surface formed with at least one displayable mark by intaglio printing or traditional ink printing; and
   at least one concealment scraping layer pattern, which includes, in volume ratio, 1-10% nitrocellulose, 5-15% polyamide resin, 20-30% silver paste, 5-15% pearl powder, 10-20% ethyl acetate, 20-30% toluene, and 5-15% isopropyl alcohol, which are mixed to form a concealment scraping layer printing ink that is applied with intaglio printing, wherein the concealment scraping layer pattern is set on and covers the at least one displayable mark.

2. The label film as claimed in claim 1, wherein the at least one displayable mark formed on the at least one surface of the single-layer label film substrate includes at least one pattern.

3. The label film as claimed in claim 1, wherein the at least one displayable mark formed on the at least one surface of the single-layer label film substrate includes at least one character.

4. The label film as claimed in claim 1, wherein the at least one displayable mark formed on the at least one surface of the single-layer label film substrate includes at least one mark.

5. The label film as claimed in claim 1, wherein the concealment scraping layer pattern has a thickness of 0.1 mm-0.3 mm.

6. The label film as claimed in claim 1, wherein the single-layer label film substrate includes a single layer of film formed of a material including one of polyvinylchloride (PVC), oriented polystyrene (OPS), polyethylene terephthalate glycol-modified (PET-G), polylactic acid (PLA), biaxially oriented polypropylene (BOPP), polyolefin (POF), non-oriented casting polypropylene (CPP), and oriented polypropylene (OPP).

* * * * *